US008315888B2

(12) United States Patent
Folsom

(10) Patent No.: US 8,315,888 B2
(45) Date of Patent: Nov. 20, 2012

(54) METHOD AND SYSTEM FOR ESTIMATING UNPAID CLAIMS

(75) Inventor: David Folsom, Littleton, CO (US)

(73) Assignee: Assets Quest, Inc., Centennial, CO (US)

( * ) Notice: Subject to any disclaimer, the term of this patent is extended or adjusted under 35 U.S.C. 154(b) by 323 days.

(21) Appl. No.: 12/704,913

(22) Filed: Feb. 12, 2010

(65) Prior Publication Data
US 2011/0202372 A1 Aug. 18, 2011

(51) Int. Cl.
*G06Q 40/00* (2012.01)
(52) U.S. Cl. .................. 705/4; 705/322; 705/30
(58) Field of Classification Search .................. None
See application file for complete search history.

(56) References Cited

U.S. PATENT DOCUMENTS

| | | | | |
|---|---|---|---|---|
| 5,136,502 A * | 8/1992 | Van Remortel et al. | ........ | 705/2 |
| 7,054,833 B1 * | 5/2006 | McDonald | ........ | 705/26.1 |
| 7,720,700 B2 * | 5/2010 | Balogh | ........ | 705/4 |
| 7,813,944 B1 * | 10/2010 | Luk et al. | ........ | 705/4 |
| 2001/0027403 A1 | 10/2001 | Peterson et al. | | |
| 2001/0032094 A1 * | 10/2001 | Ghosh et al. | ........ | 705/1 |
| 2001/0049612 A1 * | 12/2001 | Davis | ........ | 705/4 |
| 2002/0138377 A1 * | 9/2002 | Weber | ........ | 705/32 |
| 2002/0156780 A1 * | 10/2002 | Hertz et al. | ........ | 707/6 |
| 2002/0194014 A1 * | 12/2002 | Starnes et al. | ........ | 705/1 |
| 2003/0018498 A1 * | 1/2003 | Banks | ........ | 705/4 |
| 2003/0065539 A1 * | 4/2003 | Kay | ........ | 705/4 |
| 2003/0074229 A1 * | 4/2003 | Heise et al. | ........ | 705/4 |
| 2004/0236688 A1 * | 11/2004 | Bozeman | ........ | 705/42 |
| 2005/0043972 A1 * | 2/2005 | Kossol et al. | ........ | 705/4 |
| 2005/0071177 A1 * | 3/2005 | Berger | ........ | 705/1 |
| 2005/0091080 A1 | 4/2005 | Biats, Jr. | | |
| 2005/0108066 A1 * | 5/2005 | Weidner et al. | ........ | 705/4 |
| 2005/0131784 A1 * | 6/2005 | Mamorsky | ........ | 705/35 |
| 2005/0149376 A1 * | 7/2005 | Guyan et al. | ........ | 705/9 |
| 2005/0222922 A1 * | 10/2005 | Lynch | ........ | 705/30 |
| 2006/0010016 A1 * | 1/2006 | Kossol et al. | ........ | 705/4 |
| 2006/0064365 A1 * | 3/2006 | Yancey | ........ | 705/35 |
| 2006/0116914 A1 * | 6/2006 | Stemple | ........ | 705/4 |
| 2006/0136238 A1 * | 6/2006 | Froude et al. | ........ | 705/1 |
| 2006/0161463 A1 * | 7/2006 | Poonnen et al. | ........ | 705/4 |
| 2006/0229896 A1 * | 10/2006 | Rosen et al. | ........ | 705/1 |

(Continued)

FOREIGN PATENT DOCUMENTS

JP 7200674 8/1995
(Continued)

OTHER PUBLICATIONS

Employee delusions: The murky world of Employee Solutions; Sparks, Debra; Financial World, v166n4; Apr. 15, 1997; 4-pages.*
High-Tech Firms Defy Overtime Pay Rules, California Says; Jessica Guynn; KRTBN Knight-Ridder Tribune Business News (Contra Costa Times—Walnut Creek, California); Jun. 15, 1999; 6-pages.*

(Continued)

*Primary Examiner* — Gregory Johnson
(74) *Attorney, Agent, or Firm* — Foley & Lardner LLP

(57) ABSTRACT

An apparatus for analyzing liabilities including a claims analyzer. The claims analyzer can be configured to create a preliminary model of employment history of at least one organization, create a pre-audit model of the at least one organization; and create a preliminary estimate of liability associated with the at least one organization based on the preliminary model of employment history and the pre-audit model. The preliminary estimate of liability is configured to reveal an unpaid liability associated with the at least one organization.

20 Claims, 9 Drawing Sheets

U.S. PATENT DOCUMENTS

| | | | |
|---|---|---|---|
| 2006/0253306 A1* | 11/2006 | Richardson et al. | 705/4 |
| 2006/0259333 A1* | 11/2006 | Pyburn et al. | 705/4 |
| 2007/0016455 A1* | 1/2007 | Ryan et al. | 705/4 |
| 2007/0038483 A1* | 2/2007 | Wood | 705/4 |
| 2007/0088667 A1* | 4/2007 | Schwarz et al. | 707/1 |
| 2007/0136108 A1* | 6/2007 | Corsello | 705/4 |
| 2009/0048877 A1* | 2/2009 | Binns et al. | 705/4 |
| 2009/0150190 A1* | 6/2009 | Solomon et al. | 705/4 |
| 2009/0157436 A1* | 6/2009 | Craycraft | 705/4 |
| 2009/0204429 A1* | 8/2009 | Barker | 705/2 |
| 2009/0254381 A1* | 10/2009 | Frederickson et al. | 705/4 |
| 2010/0145734 A1* | 6/2010 | Becerra et al. | 705/4 |
| 2010/0179840 A1* | 7/2010 | Witkowski et al. | 705/4 |
| 2011/0015948 A1* | 1/2011 | Adams et al. | 705/4 |
| 2011/0054925 A1* | 3/2011 | Ghani et al. | 705/2 |
| 2011/0072043 A1* | 3/2011 | Wood | 707/769 |
| 2011/0099103 A1* | 4/2011 | Minnis et al. | 705/39 |
| 2011/0112851 A1* | 5/2011 | Poley | 705/2 |

FOREIGN PATENT DOCUMENTS

| | | |
|---|---|---|
| KR | 10153811 | 11/1998 |

OTHER PUBLICATIONS

Implications and opportunities in the hard insurance market; Altman, Jeffrey P; Association Management, v55n10; Oct. 2003; 6-pages.*

Leasing Workers; Resnick, Rosalind; Nation's Business; v80n11; Nov. 1992; 6-pages.*

Overtime lawsuits in California; Coyle, Michele C; Fernald, Margery M; Compensation & Benefits Review, v34n5; Sep./Oct. 2002; 10-pages.*

Owners of Dissolved Corporation Owe Employment Taxes; Anonymous; Practical Tax Strategies; v82n3; Mar. 2009; 2-pages.*

Personal liability of directors of not-for-profit corporations; Switzer, Ralph V Jr; Osterhout, Gary M; Gallagher, Timothy J; National Public Accountant; v41n2; Feb. 1996; 11-pages.*

Protection for employment entitlements: A legal perspective; Riley, Joellen; Australian Bulletin of Labour, v29n1; Mar. 2003; 15-pages.*

International Search Report and Written Opinion issued on PCT/US2011/024360, mailed Sep. 28, 2011.

* cited by examiner

Unpaid Life Insurance Benefit Claims Calculator

| | | | 310 Data Entry: |
|---|---|---|---|
| Company Name: | XYZ Corp | | Enter the shaded items from research from annual reports and other industry sources. |
| Industry: | Transportation | | |
| Employee % male: | 68% | | |
| Carrier #1 | Massive Mutual | | 320 Actions: |
| Carrier #2 | Fidelity Of Omaha | | |
| Carrier #3 | | | |
| Percent Eligible | 40% | | 330 [ Compute Missing Years ] — 360 |
| Est Claim Rate | 60% | | |
| Employee Turnover | 10% | | [ Calculate # Employees ] — 370 |
| Average Benefit | $300,000 | | |
| | | | Next step: Enter Contract Information |

History

| Year | Revenue | Profitability | Market Share | Industry Growth | Est # Employees | Average Age | States & Pct |
|---|---|---|---|---|---|---|---|
| 1999 | $ 269,307,557 | 11% | 15% | 3% | 385 | 35 | CO 50%, CA, 30%, FL 12%, NY 8% |
| 2000 | $ 286,497,401 | 12% | 18% | 2% | 409 | 35 | CO 50%, CA, 30%, FL 12%, NY 8% |
| 2001 | $ 304,784,469 | 8% | 21% | 2% | 435 | 36 | CO 50%, CA, 30%, FL 12%, NY 8% |
| 2002 | $ 324,238,797 | 6% | 24% | 3% | 463 | 37 | CO 50%, CA, 30%, FL 12%, NY 8% |
| 2003 | $ 344,934,891 | 9% | 27% | 4% | 493 | 37 | CO 50%, CA, 30%, FL 12%, NY 8% |
| 2004 | $ 366,952,011 | 16% | 30% | 4% | 524 | 38 | CO 50%, CA, 30%, FL 12%, NY 8% |
| 2005 | $ 390,374,480 | 20% | 33% | 4% | 558 | 38 | CO 50%, CA, 30%, FL 12%, NY 8% |
| 2006 | $ 415,292,000 | 16% | 36% | 3% | 593 | 38 | CO 50%, CA, 30%, FL 12%, NY 8% |
| 2007 | $ 441,800,000 | 4% | 39% | 2% | 631 | 39 | CO 50%, CA, 30%, FL 12%, NY 8% |
| 2008 | $ 470,000,000 | 5% | 42% | 2% | 671 | 39 | CO 50%, CA, 30%, FL 12%, NY 8% |
| 2009 | $ 500,000,000 | 8% | 45% | 1% | 714 | 40 | CO 50%, CA, 30%, FL 12%, NY 8% |

340

Events

| Date | Affect on Workforce | Mergers/Acquisitions or Significant Events |
|---|---|---|
| 2/1/1999 | | Founding |
| 5/16/2002 | 10% turn over | Health risk |
| 7/2/2003 | Increase in Benefits | Union Strike |

Forecast of policies and payments based on demographic estimates

| Year | # Policies | Deceased | Total Benefit | Paid Out | Unpaid | Past Grace Period | Interest | Total Interest |
|---|---|---|---|---|---|---|---|---|
| 1999 | 154 | 1 | $ 230,835 | $ 138,501 | $ 92,334 | $ 0 | $ 0 | $ 0 |
| 2000 | 179 | 2 | $ 499,488 | $ 299,693 | $ 199,795 | $ 0 | $ 0 | $ 0 |
| 2001 | 192 | 3 | $ 787,597 | $ 472,558 | $ 315,039 | $ 0 | $ 0 | $ 0 |
| 2002 | 204 | 4 | $ 1,094,327 | $ 656,596 | $ 437,731 | $ 92,334 | $ 7,387 | $ 7,387 |
| 2003 | 218 | 5 | $ 1,420,658 | $ 852,395 | $ 568,263 | $ 199,795 | $ 16,575 | $ 23,961 |
| 2004 | 231 | 6 | $ 1,767,822 | $ 1,060,693 | $ 707,129 | $ 315,039 | $ 27,120 | $ 51,081 |
| 2005 | 246 | 7 | $ 2,137,145 | $ 1,282,287 | $ 854,858 | $ 437,731 | $ 39,105 | $ 90,186 |
| 2006 | 262 | 8 | $ 2,530,042 | $ 1,518,025 | $ 1,012,017 | $ 568,263 | $ 52,676 | $ 142,862 |
| 2007 | 279 | 10 | $ 2,948,017 | $ 1,768,810 | $ 1,179,207 | $ 707,129 | $ 67,999 | $ 210,861 |
| 2008 | 296 | 11 | $ 3,392,672 | $ 2,035,603 | $ 1,357,069 | $ 854,858 | $ 85,258 | $ 296,119 |
| 2009 | 315 | 13 | $ 3,865,709 | $ 2,319,425 | $ 1,546,283 | $ 1,012,017 | $ 104,651 | $ 400,770 |
| 2010 | 315 | 14 | $ 4,338,745 | $ 2,603,247 | $ 1,735,498 | $ 1,179,207 | $ 126,398 | $ 527,168 |
| 2011 | 315 | 16 | $ 4,811,782 | $ 2,887,069 | $ 1,924,713 | $ 1,357,069 | $ 150,739 | $ 677,907 |
| 2012 | 315 | 18 | $ 5,284,819 | $ 3,170,892 | $ 2,113,928 | $ 1,546,283 | $ 177,935 | $ 855,842 |
| 2013 | 315 | 19 | $ 5,757,856 | $ 3,454,714 | $ 2,303,142 | $ 1,735,498 | $ 207,307 | $ 1,063,149 |
| 2014 | 315 | 21 | $ 6,230,893 | $ 3,738,536 | $ 2,492,357 | $ 1,924,713 | $ 239,029 | $ 1,302,178 |
| 2015 | 315 | 22 | $ 6,703,930 | $ 4,022,358 | $ 2,681,572 | $ 2,113,928 | $ 273,288 | $ 1,575,467 |
| 2016 | 315 | 24 | $ 7,176,967 | $ 4,306,180 | $ 2,870,787 | $ 2,303,142 | $ 310,289 | $ 1,885,756 |
| 2017 | 315 | 26 | $ 7,650,004 | $ 4,590,002 | $ 3,060,001 | $ 2,492,357 | $ 350,249 | $ 2,236,005 |

FIG. 6

Random Samples

Enter data collected from HR and carrier files.

Compute Revised Estimates based on Random Samples

| Employee ID | Hire Date | DOB | Gender | Eligibility | Policy Value | Deceased Date | Claimed | End of Grace Period | Interest | Total Unclaimed |
|---|---|---|---|---|---|---|---|---|---|---|
| 23423 | 2/1/1999 | 3/6/1966 | f | 2/1/2000 | $150,000 | | | | | |
| 12311 | 2/10/2000 | 8/8/1945 | m | 2/10/2001 | $400,000 | 2/5/2005 | yes | 2/5/2008 | $0 | $400,000 |
| 42065 | 9/12/2008 | 10/7/1960 | m | 9/12/2009 | $755,000 | 4/5/2002 | yes | 4/4/2005 | $0 | $0 |
| 70897 | 10/8/2004 | 6/16/1969 | f | 10/8/2005 | $292,000 | | | | $0 | $0 |
| 62036 | 6/3/2002 | 11/7/1961 | m | 6/3/2003 | $509,000 | | | | $0 | $0 |
| 95580 | 8/22/2007 | 7/27/1952 | m | 8/21/2008 | $350,000 | 5/21/1997 | no | 5/20/2000 | $271,833 | $621,833 |
| 74670 | 1/12/2007 | 3/29/1970 | f | 1/12/2008 | $456,000 | | | | $0 | $0 |
| 35645 | 6/5/2005 | 6/13/1955 | m | 6/5/2006 | $131,000 | | | | $0 | $0 |
| 90196 | 3/5/2003 | 12/26/1948 | f | 3/4/2004 | $394,000 | 3/26/2005 | no | 3/25/2008 | $58,662 | $452,662 |
| 40008 | 4/11/1999 | 6/29/1968 | m | 4/10/2000 | $375,000 | | | | $0 | $0 |
| 43859 | 8/31/2001 | 2/3/1950 | f | 8/31/2002 | $323,000 | | | | $0 | $0 |
| 19067 | 3/19/2006 | 1/24/1940 | m | 3/19/2007 | $284,000 | 10/2/2006 | no | 10/1/2009 | $7,826 | $291,826 |
| 83021 | 5/19/2002 | 10/20/1962 | f | 5/19/2003 | $729,000 | | | | $0 | $0 |
| 27332 | 1/30/2002 | 12/8/1960 | f | 1/30/2003 | $241,000 | | | | $0 | $0 |
| 71566 | 10/31/2007 | 5/6/1946 | f | 10/30/2008 | $336,000 | 11/29/2007 | yes | 11/28/2010 | $0 | $0 |
| 69857 | 2/1/2009 | 5/19/1954 | m | 2/1/2010 | $779,000 | 12/19/1994 | yes | 12/18/1997 | $0 | $0 |

FIG. 7

METHOD AND SYSTEM FOR ESTIMATING UNPAID CLAIMS

BACKGROUND

The following description is provided to assist the understanding of the reader. None of the information provided or references cited is admitted to be prior art.

The present invention relates generally to the field of insurance policy analysis and more particularly to insurance claims analysis.

It is a common practice for large employers to provide life insurance as a standard benefit or incentive to its employees. Generally, employers pay most, if not all, of the premiums on these life insurance policies. Life insurance benefits are typically bundled with other benefits and provided to the employee as a package. The group size of the covered employees often warrants a substantially discounted premium and translates to similarly reduced benefit values. As a result, it is common for the beneficiaries of such policies to be unaware of the policy's existence when a valid claim arises. Consequently, billions of dollars in death benefits are held by insurance companies awaiting claim from, for example, the relatives of these employees.

There are several parties who have an interest in these claims including, but not limited to: the beneficiaries have an interest in being made aware of the existence of their rights to claim these benefits; the employers have an interest in ensuring that their employees are paid their due benefits in return for the consideration provided, often by the employer, in the form of premiums; and the state has an interest in ensuring that the employer and insurance company are complying with all applicable laws governing such life insurance policies. Audit enforcement is based on a group life insurance contract providing the face amount of coverage, rules of employee eligibility, and premium payment responsibilities.

Since a beneficiary's ignorance of the existence of a policy renders them incapable of pursuing a claim, it is generally up to the employer or government to effect the final dispensation of these benefits. The data about such policies often predates computer records, spans decades, and is incomplete within any of the subject entities (i.e. no single entity knows the insured's name, social security number (SSN), benefit amount, policy date, premium payment records and effective coverage dates, contract terms, insured's date of death, insured's final address, beneficiary names, addresses, and SSN, whether a claim has been made, date and amount of any payout, etc.). As a result, the effort involved in reconciling or auditing these benefits is generally prohibitive.

Therefore, there is a need for systems and methods for analyzing insurance plans. In addition, there is a need for systems and methods for analyzing insurance claim liabilities. In addition, there is a need for systems and methods for analyzing compliance with state or federal insurance laws.

SUMMARY

In one illustrative embodiment, an apparatus for analyzing liabilities includes a claims analyzer. The claims analyzer can be configured to create a preliminary model of employment history of at least one organization, create a pre-audit model of the at least one organization; and create a preliminary estimate of liability associated with the at least one organization based on the preliminary model of employment history and the pre-audit model. The preliminary estimate of liability is configured to reveal an unpaid liability associated with the at least one organization.

In another illustrative embodiment, a method for analyzing liabilities includes creating, at a claims analyzer, a preliminary model of employment history of at least one organization. A pre-audit model of the at least one organization is created. A preliminary estimate of liability associated with the at least one organization is created based on the preliminary model of employment history and the pre-audit model. The preliminary estimate of liability is configured to reveal an unpaid liability associated with the at least one organization.

In another illustrative embodiment, an article of manufacture includes a computer-readable medium having instructions stored thereon that, if executed by a computing device, cause the computing device to perform operations. The operations include creating a preliminary model of employment history of at least one organization, creating a pre-audit model of the at least one organization, and creating a preliminary estimate of liability associated with the at least one organization based on the preliminary model of employment history and the pre-audit model. The preliminary estimate of liability is configured to reveal an unpaid liability associated with the at least one organization.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 is an illustration of a screenshot of a user interface of an employment history analyzer in accordance with a representative embodiment.

FIG. 6 is an illustration of a screenshot of a user interface of a preliminary liability analyzer in accordance with a representative embodiment.

FIG. 7 is an illustration of a screenshot of a user interface of a revised liability analyzer based on actual data in accordance with a representative embodiment.

DETAILED DESCRIPTION OF THE EMBODIMENTS

Figure 1:
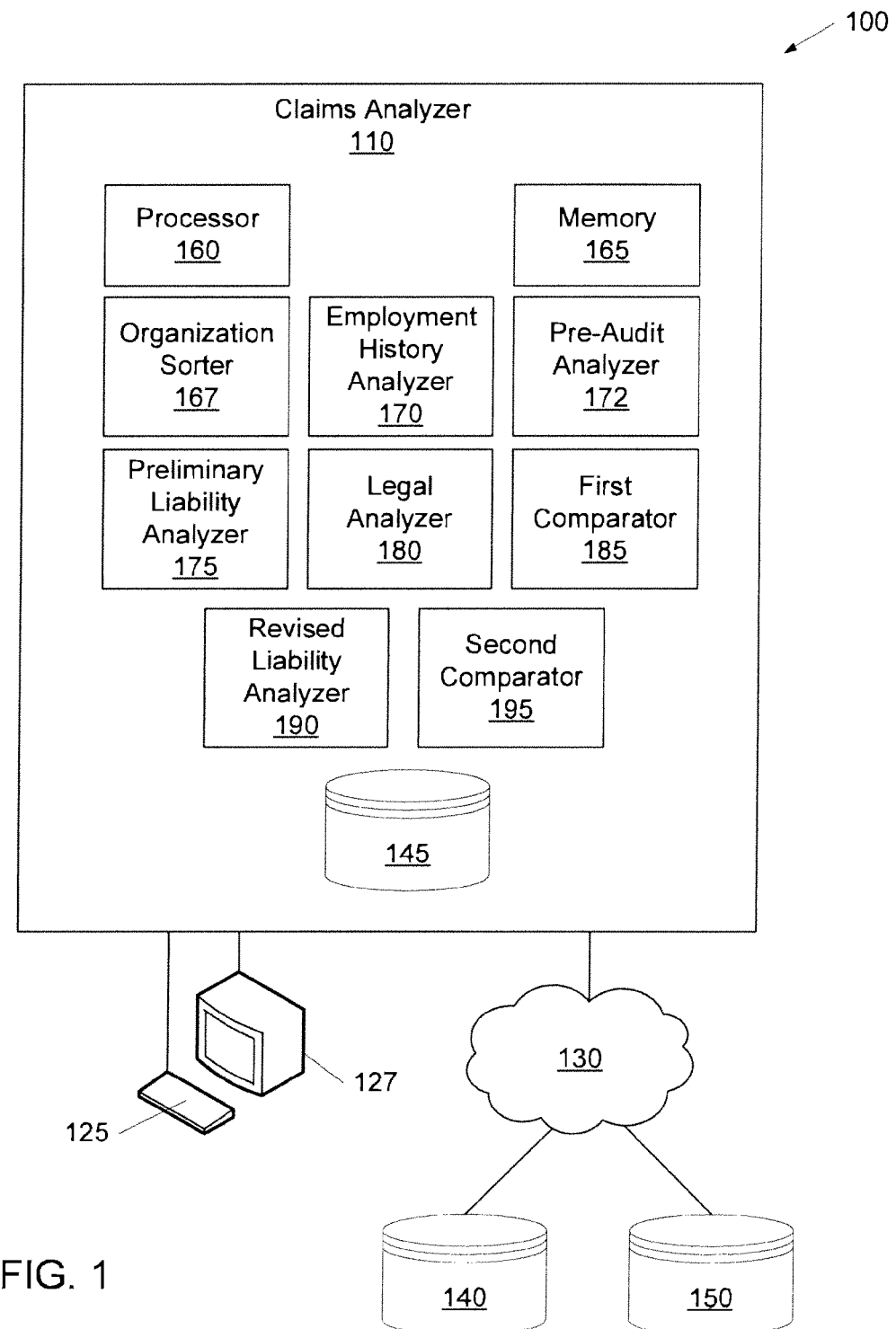
FIG. 1 is a diagram of a system for estimating unpaid claims in accordance with a representative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A method and system for estimating unpaid claims are described. For example, the method and system can assess the financial value of all outstanding claims on life insurance policies issued by an insurance carrier as part of a subject large employee group benefits program. In one illustrative embodiment, the range of possible liability to beneficiaries as well as any government liability such as required asset transfer, penalties, fees, etc. as described in a governing state's statutes pertaining to unclaimed/abandoned property can be estimated.

A forensic pre-audit of a subject employer produces an estimated range of liability and supporting documentation thereof. This estimate and supporting information can be provided to the state's attorney general, state treasurer, and/or comptroller's office. Upon reviewing and accepting the range of estimated government liability generated by the method and system for estimating unpaid claims, authorization can be requested by an attorney general to audit the subject employer's human resource files as well as the predominant group life insurance provider identified in the pre-audit for further audit and settlement of liabilities. Alternatively, the method and system for estimating unpaid claims can be used for analyzing other unpaid claims or liabilities such as health insurance benefits, disability benefits, pension benefits, death benefit riders such as burial policies, or retirement benefits.

Referring to FIG. 1, a diagram of a system 100 for estimating unpaid claims in accordance with a representative embodiment is shown. The system 100 for estimating unpaid claims includes a claims analyzer 110, an input device 125, and a display device 127. The input device 125 can include a keyboard, mouse, a touch screen, a touch pad, or any other input device known to those of skill in the art. The display device 127 can include a monitor, a printer, a liquid crystal display, a cathode ray tube display, or other type of display known to those of skill in the art. The claims analyzer 110 can be connected to a network 130, such as the Internet. The claims analyzer 110 can be communicatively coupled to a database 140 and a web server 150 though network 130. Alternatively, the database 140 and the web server 150 can be directly communicatively coupled to claims analyzer 110. In alternative embodiments, the system for estimating unpaid claims 100 may include fewer, additional, and/or different components.

The claims analyzer 110 can be a computing device such as a personal computer, a mainframe, a cloud computing network, a server, or any other computing device. The claims analyzer 110 can include a processor 160, a memory 165, an organization sorter 167, an employment history analyzer 170, a pre-audit analyzer 172, a preliminary liability analyzer 175, a legal analyzer 180, a first comparator 185, a revised liability analyzer 190, a second comparator 195, and a proprietary database 145. Memory 165, which can be any type of permanent or removable computer memory known to those of skill in the art, can be a computer-readable storage medium. Memory 165 can be configured to store the organization sorter 167, the employment history analyzer 170, the pre-audit analyzer 172, the preliminary liability analyzer 175, the legal analyzer 180, the first comparator 185, the revised liability analyzer 190, the second comparator 195, and an application configured to run the organization sorter 167, the employment history analyzer 170, the pre-audit analyzer 172, the preliminary liability analyzer 175, the legal analyzer 180, the first comparator 185, the revised liability analyzer 190, the second comparator 195. Memory 165 can also store other information and applications as known to those of skill in the art. Alternatively, the organization sorter 167, the employment history analyzer 170, the pre-audit analyzer 172, the preliminary liability analyzer 175, the legal analyzer 180, the first comparator 185, the revised liability analyzer 190, and the second comparator 195 can be electrical circuits.

The organization sorter 167 can be software, which can be implemented as computer-readable instructions configured to be stored on memory 165, to sort organizations based on their financial and/or employment characteristics. Organizations can include public and private employers, non-profits, fraternal organizations, clubs, professional organizations, the federal government, state government, and/or municipalities. The organization sorter 167 can analyze publicly available data and/or employer lists related to organizations. The publicly available data and employer lists can be obtained from database 140, proprietary database 145, and/or web server 150. The publicly available data and/or employer lists can be complied from various sources including Department of Labor publications, lists in business magazines, or other online databases. The organization sorter 167 compiles the publicly available data and/or employer lists into an organization list of potential employee groups for analysis, including estimated revenues, number of employees, years, etc.

The organization list is then sorted and prioritized by both quantitative and qualitative factors including, but not limited to, the size of each organization in terms of both employment and revenues, the state of domicile for each employer, and the reputation of each employer for the types of employees and inclination toward generous benefits programs. In one illustrative embodiment, a top prioritized organization is selected for further analysis.

The employment history analyzer 170 can be software, which can be implemented as computer-readable instructions configured to be stored on memory 165, to create at least one preliminary model of employment history. In one embodiment, employment history analyzer 170 can include a computer program and/or an application configured to execute the program such as Matlab available from The MathWorks, Inc., Natick, Mass., or Excel available from Microsoft Inc., Redmond, Wash. Alternatively, other programming languages and/or applications known to those of skill in the art can be used. In one embodiment, employment history analyzer 170 can be a dedicated standalone application. Processor 160, which can be in electrical communication with each of the components of claims analyzer 110, can be used to run the application and to execute the instructions of employment history analyzer 170. Any type of computer processor(s) known to those of skill in the art may be used.

For a selected organization, the employment history analyzer 170 generates a preliminary model of the selected organization's employment history based on and cross-checked against publicly available data including, but not limited to news publications, company annual reports, United States Department of Labor industry-specific census data and reporting information, an insurance commissioner's file, and/or actuarial tables some or all of which can be obtained from database 140, proprietary database 145, and/or web server 150. Using, for example, the selected organization's market share, profitability, merger/acquisition activity, significant restructuring events, newsworthy company events, stated reserves, known layoffs and/or mass early retirement buyouts, or indications of financial trouble, the employment history analyzer 170 constructs a preliminary model of employment history. In summary, the preliminary model of employment history is an estimate of the selected organization's financial and employment characteristics for a given period of time.

Figure 2:
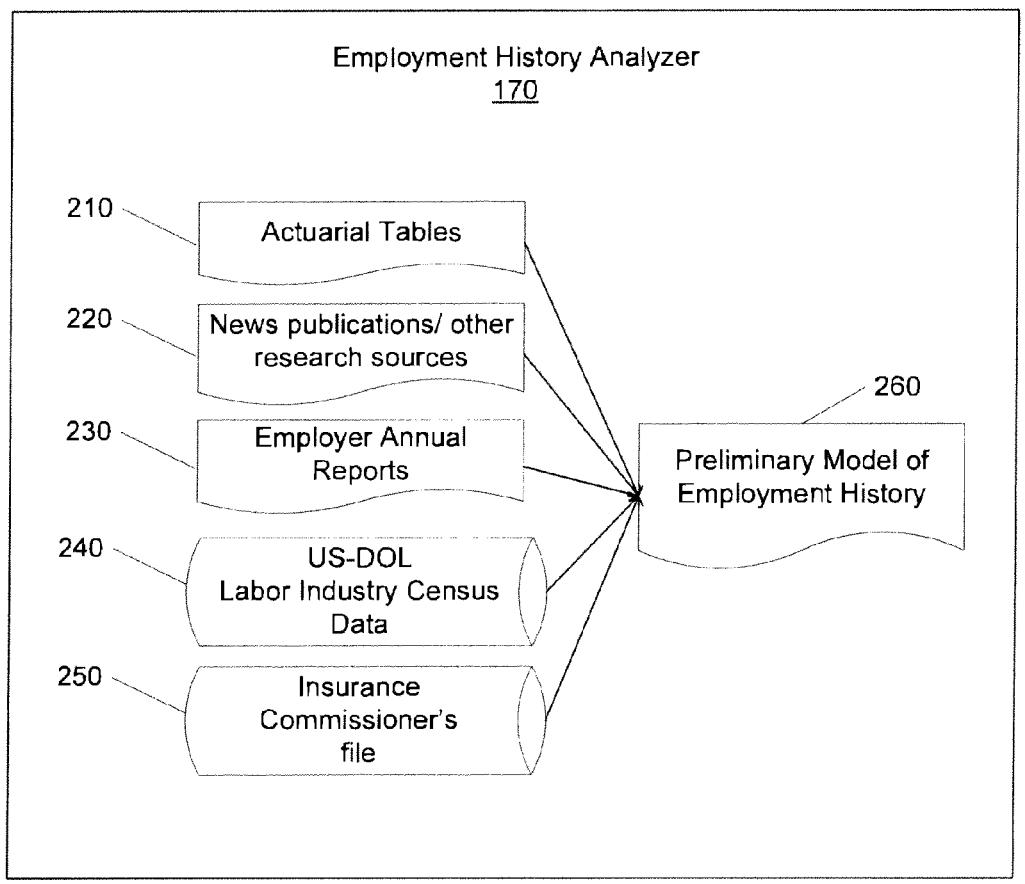
FIG. 2 is a diagram of the employment history analyzer of FIG. 1 in accordance with a representative embodiment.

Referring to FIG. 2, a diagram of the employment history analyzer 170 of FIG. 1 in accordance with a representative embodiment is shown. The employment history analyzer 170 uses, for example, actuarial tables 210, news publications 220, employer annual reports 230, United States Department of Labor (US-DOL) industry census data 240, and an insurance commissioner's file to build an organization profile 260. More or fewer data resources can be used to build the organization profile 260. The organization profile 260 includes information such as how many people were employed by the selected organization and what insurance carriers have been used to provide employee benefits.

Referring to FIG. 3, an illustration of a screenshot of a user interface 300 of an employment history analyzer in accordance with a representative embodiment is shown. A user can enter information to build a preliminary model of employment history, for example, information from research, from annual reports, and other industry sources. Alternatively, the information can be automatically imported. In one embodiment, the user interface 300 can include a spreadsheet 305. The spreadsheet 305 can include a general data entry area 310, carrier data entry area 320, employee benefit data entry area 330, historical data entry area 340, and events data entry area 350.

The general data entry area 310 can include an area to provide information such as a company name, an industry of the company, and the percent of employees that are male. The carrier data entry area 320 can include an area to provide information such as the names of life insurance providers or any other contractual benefit providers or insurers. The employee benefit data entry area 330 can include an area to provide information such as the percent of employees eligible for life insurance or any other contractual benefit, the percentage of employees that make a claim to the benefit, employee turnover rates, and an average benefit amount for a typical employee. The events data entry area 350 can include an area to provide information regarding events that may effect employment rates or benefits such as work conditions, strikes, etc.

The historical data entry area 340 can include an area to provide information for a particular year such as profitability, market share, industry growth, the estimated number of employees, the average age of the employees in a particular year, the states where employees are located. However, in some cases, complete data is not available. Spreadsheet 305 can include a compute missing years button 360 that can cause the spreadsheet 305 to estimate unknown data using, for example, interpolation. Spreadsheet 305 can also include a calculate number of employees button 370 that can cause the spreadsheet 305 to estimate the number of employees when unknown using, for example, interpolation. Alternatively, other estimation techniques can be used. The estimates can also be adjusted manually.

Referring again to FIG. 1, the pre-audit analyzer 172 can be software, which can be implemented as computer-readable instructions configured to be stored on memory 165, to create at least one profile of an organization's employment history.

In one embodiment, pre-audit analyzer 172 can include a computer program and/or an application configured to execute the program such as Matlab available from The MathWorks, Inc., Natick, Mass., or Excel available from Microsoft Inc., Redmond, Wash. Alternatively, other programming languages and/or applications known to those of skill in the art can be used. In one embodiment, pre-audit analyzer 172 can be a dedicated standalone application. Processor 160, which can be in electrical communication with each of the components of claims analyzer 110, can be used to run the application and to execute the instructions of pre-audit analyzer 172. Any type of computer processor(s) known to those of skill in the art may be used.

For the selected organization, the pre-audit analyzer 172 generates a pre-audit model of the contractual liability of the selected organization over a given period of time. For example, the model can aggregate the various life insurance contracts issued through the selected organization. The model of the contractual liability of the selected organization can include information about the subject employer's predominant life insurance provider/carrier, information about benefits contracts issued through the selected organization, employee awareness of the benefits contracts issued through the selected organization, information about events in company history materially affecting employment, and information about enrollment statistics, record of past death rates, life expectancy, and/or annual death rate of pension survivors. The above information can be obtained from database 140, proprietary database 145, and/or web server 150. Alternatively, the information can be manually collected and entered into the claims analyzer 110. In one illustrative embodiment, a forensic pre-audit investigation is conducted by contacting and interviewing any and all relevant parties including but not limited to industry representatives, retired business leadership, current employees, the organization's human resources department, any pension plan coordinators or administrators for the subject employer, and any family or descendants of the aforementioned.

In some embodiments of the method, results from the forensic pre-audit investigation may justify further research of public records, in which case research and further investigation may repeat until sufficient information is discovered to create the preliminary model of employment history and the pre-audit model. Advantageously, the preliminary model of employment history, the pre-audit model, the preliminary audit, investigation, and research can contain the effort and expense required to arrive at an accurate estimate of liability sufficient to warrant authorization by state government to authorize further audit.

Figure 4:
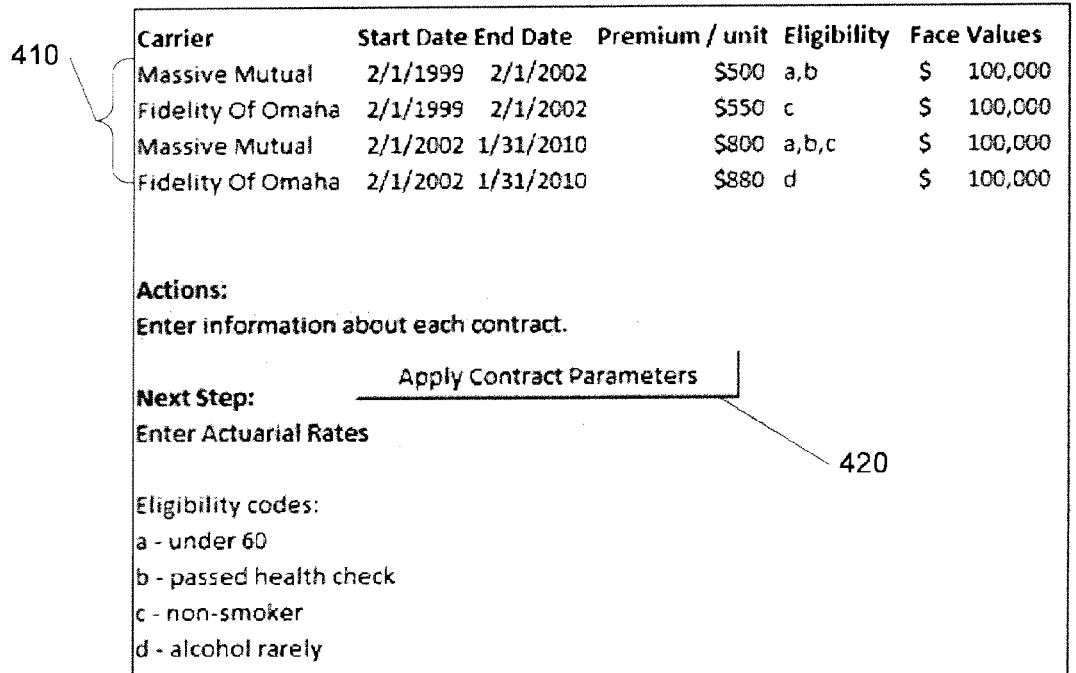
FIG. 4 is an illustration of a screenshot of a user interface of a pre-audit analyzer in accordance with a representative embodiment.

Referring to FIG. 4, an illustration of a screenshot of a user interface 400 of a pre-audit analyzer in accordance with a representative embodiment is shown. A user can enter information to build a pre-audit model. Alternatively, the information can be automatically imported. In one embodiment, the user interface 400 can include a spreadsheet 405. The spreadsheet 405 can include a carrier contract data entry area 410 including an area to provide information such as the carrier name, contract start date, end date, premium, eligibility, face values, and any other pertinent info to assist in the calculation of the estimate. Spreadsheet 405 can include an apply contract parameters button 420 that can cause the spreadsheet 405 to apply carrier contract to a pre-audit model.

Figure 5:
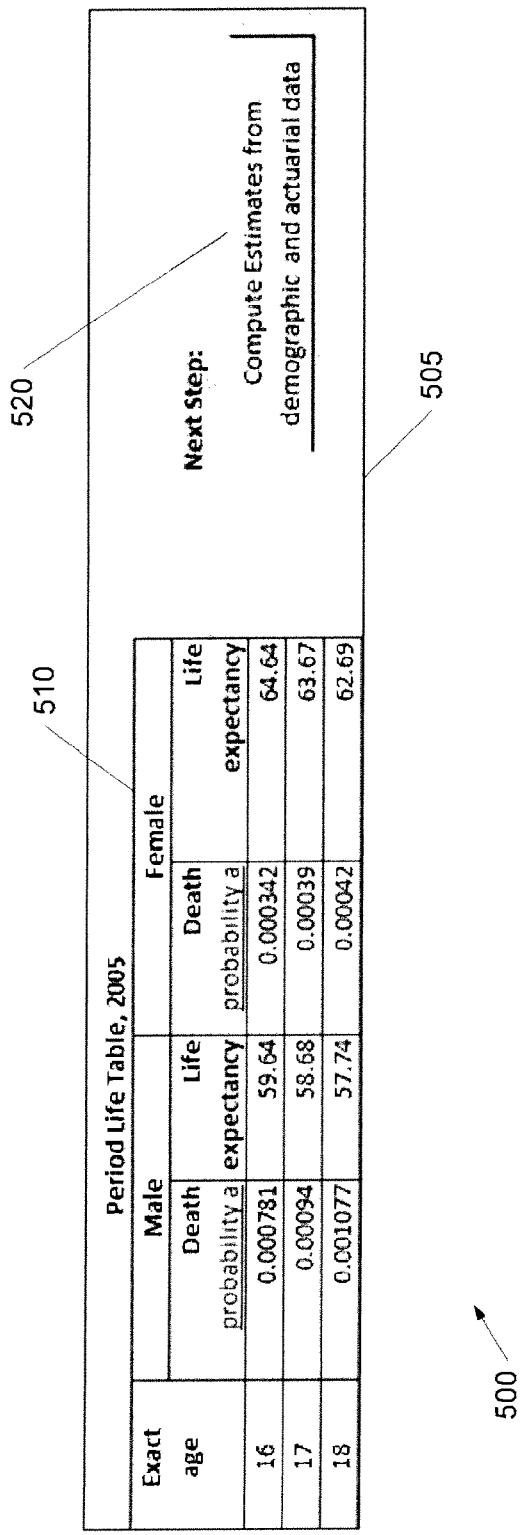
FIG. 5 is an illustration of a screenshot of a second user interface of a pre-audit analyzer in accordance with a representative embodiment.

Referring to FIG. 5, an illustration of a screenshot of a second user interface 500 of a pre-audit analyzer in accordance with a representative embodiment is shown. A user can enter information to build a pre-audit model. Alternatively, the information can be automatically imported. In one embodiment, the user interface 500 can include a spreadsheet 505. The spreadsheet 505 can include a periodic life table 510. The periodic life table 510 includes, for example, death probability information and life expectancy information for males and females at various ages. The periodic life table 510 can be populated with actual data or using actuarial tables. The periodic life table 510 can be adjusted for particular occupations, state of employment, etc. Spreadsheet 505 can include a compute estimates from demographic and actuarial data button 520 that can cause the spreadsheet 505 to apply demographic and actuarial to a pre-audit model.

Referring again to FIG. 1, the preliminary liability analyzer 175 can be software, which can be implemented as computer-readable instructions configured to be stored on memory 165, to create at least one preliminary estimate of liability. In one embodiment, preliminary liability analyzer 175 can include a computer program and/or an application configured to execute the program such as Matlab available from The MathWorks, Inc., Natick, Mass., or Excel available from Microsoft Inc., Redmond, Wash. Alternatively, other programming languages and/or applications known to those of skill in the art can be used. In one embodiment, preliminary liability analyzer 175 can be a dedicated standalone application. Processor 160, which can be in electrical communication with each of the components of claims analyzer 110, can be used to run the application and to execute the instructions of preliminary liability analyzer 175. Any type of computer processor(s) known to those of skill in the art may be used.

For the selected organization, the preliminary liability analyzer 175 generates adjustment factors for the pre-audit model based on the preliminary model of employment history, the selected organization's financial characteristics, and comparable contractual liabilities of comparable organizations. For example, the qualitative and quantitative findings of the pre-audit model are correlated with previous audit findings of similarly profiled employers and adjusted for differing factors to come up with one or more adjustment factors. The preliminary liability analyzer 175 applies the adjustment factors to the pre-audit model and the preliminary model of employment history which are then used to compute the selected organization's preliminary estimate of liability.

The preliminary estimate of liability can be determined for a given period time. Existing liabilities can be calculated based on death records from the Social Security Administration. Future liabilities can be forecasted based on, for example, the pre-audit model. Interest and penalties can be calculated based on a state's statutory timing and rate of interest and penalties. In summary, the preliminary liability analyzer 175 generates a preliminary estimate of liability for the selected organization.

Referring to FIG. 6, an illustration of a screenshot of a user interface 600 of a preliminary liability analyzer in accordance with a representative embodiment is shown. A user can enter information to build a liability model. Alternatively, the information can be automatically imported. In one embodiment, the user interface 600 can include a spreadsheet 605. The spreadsheet 605 can include a forecast table 610. The forecast table 610 can be a forecast of policies and payments based on demographic estimates as determined by a preliminary liability analyzer. For each year, up to a predetermined number of years in the future, the forecast table 610 presents, for example: an estimated number of policies, based on information from an organization profile and pre-audit profile; an estimated number of deceased policy holders that year based on actuarial rates; an estimated total of benefits due for the deceased policy holders; an estimated running total paid out (collected by policy holders); an estimated running total not paid out (uncollected benefits); a running total of the estimated uncollected benefits past the various states' grace periods (past grace period); an estimated interest due on that year's uncollected benefits and compounded interest; and a running total of past due interest. If the total past grace period and interest warrants further investigation these estimates can be included in a report requesting full verification of the finding. The total past grace period and interest can be the preliminary estimate of liability for the selected organization.

Referring again to FIG. 1, the preliminary estimate of liability for the selected organization can be compared to a legal model of the legal analyzer 180 by first comparator 185. The legal analyzer 180 can include financial measures based on a particular state's laws. For example, in the State of Colorado, life insurance organizations are regulated by the Department of Regulatory Agencies, Division of Insurance. For example, these regulations and statutes generally require an insurance issuer pay-out a certain amount in benefits even if a beneficiary does not file a claim. The legal analyzer 180 can adjust a legal model based on, for instance, the size of the organization, the states where employees work, and an estimate of the number of insured employees. The first comparator 185 compares the preliminary estimate of liability for the selected organization with the legal model of the legal analyzer 180 to determine if there is a likelihood that the organization and its associated group life insurance provider are not in compliance with the particular state's law.

If it appears that the organization and its associated group life insurance provider are not in compliance with the particular state's law, the preliminary estimate of liability for the selected organization, as well as its supporting research and findings, can be presented to state officials including, but not limited to, the Treasurer, Attorney General, and Comptroller's office along with a request for authorization to subpoena both the employer and insurance carrier's financial and human resources records for a more detailed verification of the estimate provided.

If state authorization is not provided, another estimate for another large employee group or another state for the same employer group is compiled and further authorization is requested. However, if authorization is granted, the human resources and financial records of the employer and/or insurance carrier can be requested and, if necessary, subpoenaed for audit.

The revised liability analyzer 190 can be software, which can be implemented as computer-readable instructions configured to be stored on memory 165, to create at least one profile of an organization's employment history. In one embodiment, the revised liability analyzer 190 can include a computer program and/or an application configured to execute the program such as SPSS available from International Business Machines, Inc. of New York, Matlab available from The MathWorks, Inc., Natick, Mass., or Excel available from Microsoft Inc., Redmond, Wash. Alternatively, other programming languages and/or applications known to those of skill in the art can be used. In one embodiment, the revised liability analyzer 190 can be a dedicated standalone application. Processor 160, which can be in electrical communication with each of the components of claims analyzer 110, can be used to run the application and to execute the instructions of the revised liability analyzer 190. Any type of computer processor(s) known to those of skill in the art may be used.

For the selected organization, the revised liability analyzer 190 can update the preliminary estimate of liability based on the human resources and financial records of the employer and/or insurance carrier. The revised liability analyzer 190 includes a statistical analysis software and several different computational models applied in order to obtain sufficient verification, documentation, written statements, and financial reconciliation to verify or correct and substantiate the original estimate of liability. For example, the revised liability analyzer 190 can be take a random sample of individual cases drawn from the human resources and financial records of the employer and/or insurance carrier. The revised liability analyzer 190 can then extrapolate liability statistics from the sample set such as the percent insured in a particular state. The revised liability analyzer 190 can be based on a single statistical analysis or multiple statistical analyses.

Referring to FIG. 7, an illustration of a screenshot of a user interface 700 of a revised liability analyzer in accordance with a representative embodiment is shown. A user can enter information to build a organization model based on actual data. Alternatively, the information can be automatically imported. In one embodiment, the user interface 700 can include a spreadsheet 705. The spreadsheet 705 can include a sample table 710. The sample table 710 includes data on various employees that have deceased. For example, the date can include an employee identifier, date of hire, date of birth, gender, the date the employee became eligible for life insurance benefits, the policy value, the date of death of the employee, if the policy has been claimed, and any other data required for calculating revised estimates of unclaimed policy values. The sample should be a random sample of employee human resources records. The sample data should be correlated with policy information from the carriers and state death certificates. Spreadsheet 705 can include a compute revised estimates based on random samples button 720 that can cause the spreadsheet 705 to combine the sample data with other data already entered, for example, the preliminary estimate of liability, to compute estimates of unclaimed benefits, based on the statistics from the random sample. The revised estimate of liability (i.e. revised estimates of unclaimed benefits) will look like the preliminary estimate of liability (as in FIG. 6), but have a lower threshold of error.

Referring again to FIG. 1, the second comparator 195 can be software, which can be implemented as computer-readable instructions configured to be stored on memory 165, to determine if the pre-audit model is accurate. In one embodiment, the second comparator 195 can include a computer program and/or an application configured to execute the program such as Matlab available from The MathWorks, Inc., Natick, Mass., or Excel available from Microsoft Inc., Redmond, Wash. Alternatively, other programming languages and/or applications known to those of skill in the art can be used. In one embodiment, the second comparator 195 can be a dedicated standalone application. Processor 160, which can be in electrical communication with each of the components of claims analyzer 110, can be used to run the application and to execute the instructions of the second comparator 195. Any type of computer processor(s) known to those of skill in the art may be used.

For a selected organization, the second comparator 195 verifies the preliminary estimate of liability for the selected organization (from the pre-audit model) against the revised estimate of liability from the revised liability analyzer 190 (i.e. revised estimates of unclaimed benefits) creating a statistically verified estimate of liability. The second comparator 195 compares statistically verified estimate of liability to actual money paid to beneficiaries. If there is a material difference between the statistically verified estimate of liability and the actual money paid to beneficiaries, the selected organization is flagged. Materiality is defined by state law.

If there is a material difference between the statistically verified estimate of liability and the actual money paid to beneficiaries, a third party auditor can be retained to provide certification and attestation of the findings. Such attestation and substantiation of a finding of material liability can justify a request of the insurance carrier to provide a written authorization certifying liability to the state and unpaid beneficiaries. If the insurance company will not provide such certification for any reason, the matter can be forwarded to the Attorney General's office with the analyses and models of the claims analyzer 110 becoming the primary evidence in support of litigation toward the resolution of the discovered liabilities. Alternatively, the employer and/or insurance carrier can settle the claims.

A claims analyzer can be configured to be company-centric, state-centric, or year-centric. In other embodiments, a claims analyzer can be designed to focus on the highest possible, lowest possible, and most likely values throughout the application. For example, the claims analyzer can determine the highest possible unclaimed value, the lowest possible unclaimed value, and the most reasonable unclaimed value. The revised estimates would narrow the range of highest to lowest unclaimed values.

A system for estimating unpaid claims can be based on various technologies, including but not limited to desktop applications, database applications, web-based applications, and mobile applications. A system for estimating unpaid claims can also take advantage of document scanning and reading technologies for data entry, web surveys for data collection, automated phone interactive voice response systems, and importing data from companies' human resources databases or carrier policy databases. Systems for estimating unpaid claims can also incorporate technologies like rule-based expert systems and statistical analysis and regression to build estimates and fill in missing data. Systems for estimating unpaid claims can also employ various strategies for distributed data collection or field offices, uniting research from numerous individual researchers into consolidated calculations and reporting. Advantageously, the system for estimating unpaid claims can provide an estimate of unpaid claims to identify insurers that have material unpaid liabilities.

Figure 8A:
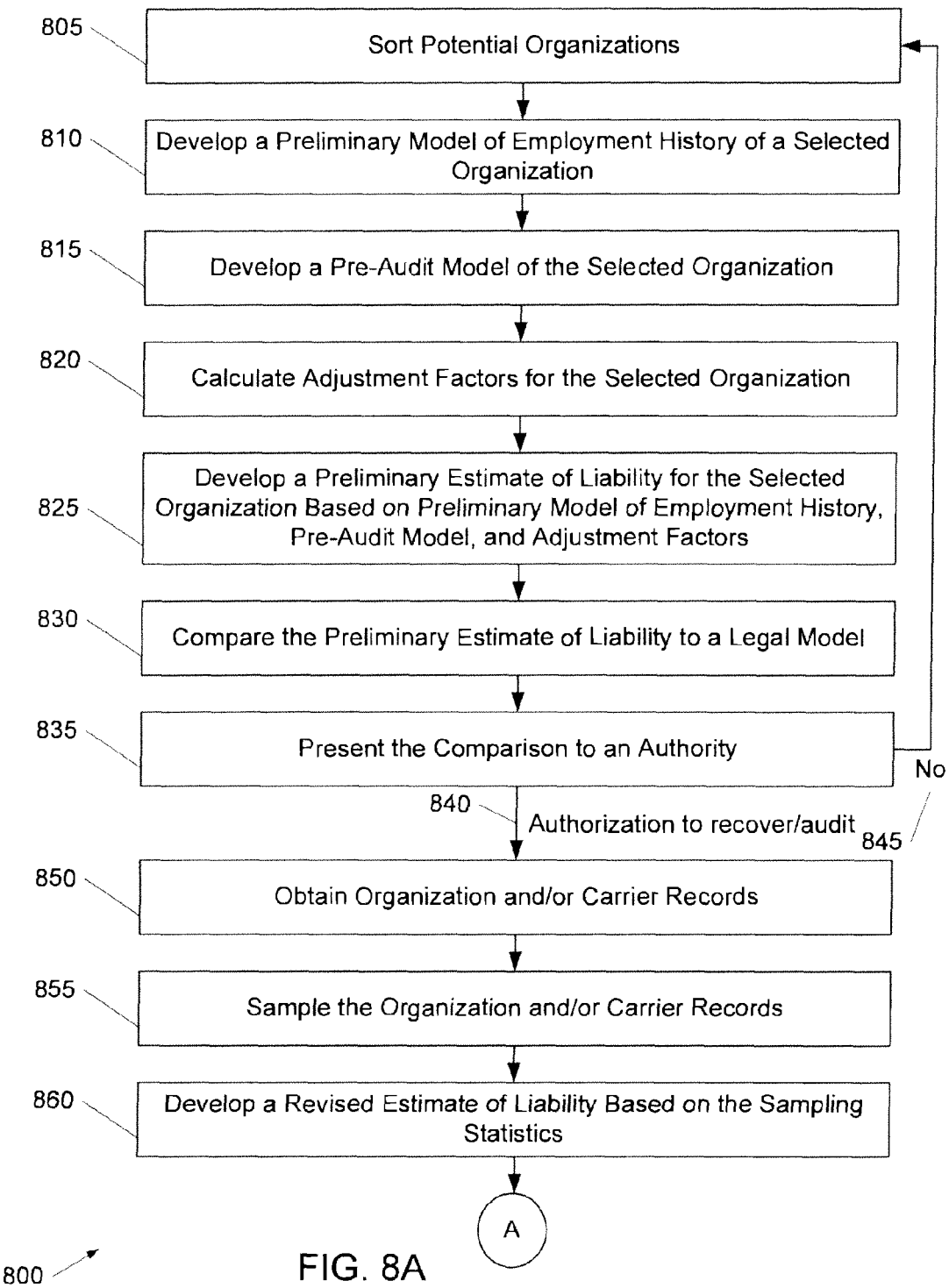
FIG. 8A is a flow diagram of a method for estimating unpaid claims in accordance with a representative embodiment.

Referring to FIG. 8A, a flow diagram of a method 800 for estimating unpaid claims in accordance with a representative embodiment is shown. Additional, fewer, or different operations may be performed depending on the particular implementation. The operations for estimating unpaid claims 800 can be executed, for example, in least in part by a system for estimating unpaid claims, such as the system described above.

In an operation 805, potential organizations are sorted based on the characteristics of the organizations. For example, organizations can be sorted based on the amount of salary and/or wages paid per year. The list of organizations can be compiled based on publicly available employer data such as annual reports. In particular, the list of organizations can include companies that have been employing and potentially offering life insurance benefits to large groups of employees within the subject state for more than a decade. At least one organization is selected for further analysis.

In an operation 810, a preliminary model of employment history of the selected organization can be developed. The preliminary model of employment history can include information such as: employer profitability/revenue history/market share numbers; U.S. Department of Labor industry labor statistics; any reports of merger/acquisition activity and its timing; any event resulting in workforce reduction or augmentation and its timing, particularly early retirement buy-outs; employee demographic factors that may affect life expectancy including age, gender, vocational health hazards, professional status, union status, contract variations, etc.; stated reserves and/or contract data from the Insurance Commissioner's file; annual reports of, employer for trends in employee benefits (unrelated to group life insurance), history of premium payments; and profitability-related increases or decreases in benefits packages. Generally, the preliminary model of employment history captures the number of employees the organization has employed for a certain period, the likely percentage of employees covered by a particular benefit contracts over that period, and the likely value of the benefit contracts. The preliminary model of employment history can be automatically or manually populated using publicly available data.

In an operation 815, a pre-audit model of the selected organization can be developed. The pre-audit model can include information such as: the selected organization's predominant life insurance provider/carrier; copies of group life contracts detailing rules for the determination of employee eligibility, group/subgroup descriptions/numbers, face values, and date for start of coverage; employee awareness levels of the existence of any group life insurance programs, premium responsibilities, anecdotal evidence of claims procedure complexity and/or widow claim frequency; knowledge of events in company history materially affecting employment; and adjusting or verifying numbers such as enrollment statistics, record of past death rates, life expectancy, and/or annual death rate of pension survivors. The pre-audit model can be automatically or manually populated using publicly available data. However, in many situations, a forensic pre-audit investigation may be needed. Users can gather the above information by interviewing industry representatives, retired business leadership, current employees, human resources department employees, pension plan coordinators, and/or family members who are willing to share information.

In an operation 820, adjustment factors are calculated for the selected organization. The adjustment factors can be determined from forensic pre-audit findings and applied to the preliminary candidate employment history. Employment numbers are combined with discovery of benefits contracts for forecast, with interest, of the potential liability to the state of domicile for compliance with unclaimed property law. For example, using other data for a particular insurer related to a different organization, the pre-audit model can be adjusted to account for the particular insurer's previous practices.

In an operation 825, a preliminary estimate of liability for the selected organization is developed based on preliminary model of employment history, pre-audit model, and adjustment factors. The preliminary estimate of liability can include a forecast of policies and payments based on demographic estimates. For a given period, up to a predetermined number of years in the future, the forecast can include: an estimated number of policies, based on information from an organization profile and pre-audit profile; an estimated number of deceased policy holders that year based on actuarial rates; an estimated total of benefits due for the deceased policy holders; an estimated running total paid out (collected by policy holders); an estimated running total not paid out (uncollected benefits); a running total of the estimated uncollected benefits past the various states' grace periods (past grace period); an estimated interest due on that year's uncollected benefits and compounded interest; and a running total of past due interest. If the total past grace period and interest warrants further investigation these estimates can be included in a report requesting full verification of the finding. The total past grace period and interest, for example, can be the preliminary estimate of liability for the selected organization In an operation 830, the preliminary estimate of liability can be compared to a legal model. The legal model represents the applicable law for a given situation. For example, in a particular state, an insurer may be required to keep the ratio of unpaid claims to paid claims below a certain maximum. The legal model captures these state laws and regulations. The preliminary estimate of liability is compared to the legal model and compliance with a state's law and regulations is determined.

In an operation 835, if the selected organization does not appear to be in compliance with state law and regulations based on the comparison, one or all of the preliminary estimate of liability, the pre-audit model, the preliminary model of employment history, the adjustment factors, and support documentation can be presented to an authority such as a state insurance regulator, requesting authorization to subpoena both organization and insurance carrier records for full verification and audit of findings. The authority can be, for example, a state treasurer, attorney general, and/or comptroller's office. If the authority authorizes recovery or an audit, operations flow 840 can be followed. Otherwise, if the authority does not authorize recovery or an audit, operations flow 845 can be followed such that operation 805 can be repeated and the next organization can be analyzed.

In an operation 850, at least some of the selected organization's and/or the insurance carrier's records are obtained using authority granted in operation 835. For example, organization records and/or insurance carrier records can be requested or subpoenaed. For example, the organization records or insurance carrier records can be human resources records, financial records, and or individual policies from the organization and/or insurance carrier.

In an operation 855, the obtained organization records and/or insurance carrier records are sampled. The sample can be a random sample of employee records. The sample data should be correlated with policy information from the carriers and state death certificates. A statistical analysis can include random sample verifications, documentation, and written statements. The statistical analysis can be documented.

In an operation 855, a revised estimate of liability is developed based on the sampling statistics. The preliminary estimate of liability can be adjusted using the statistical analysis of operation 855. For example, the sample set might show a different percentage of unpaid policies than what was assumed in the preliminary estimate of liability. The preliminary estimate of liability can be modified using the statistically verified percentage of unpaid policies thereby creating a revised estimate of liability. The various factors of the preliminary estimate of liability can each be statistically verified and adjusted if necessary. The operations for estimating unpaid claims continue to reference point 'A' from FIG. 8A to FIG. 8B.

Figure 8B:
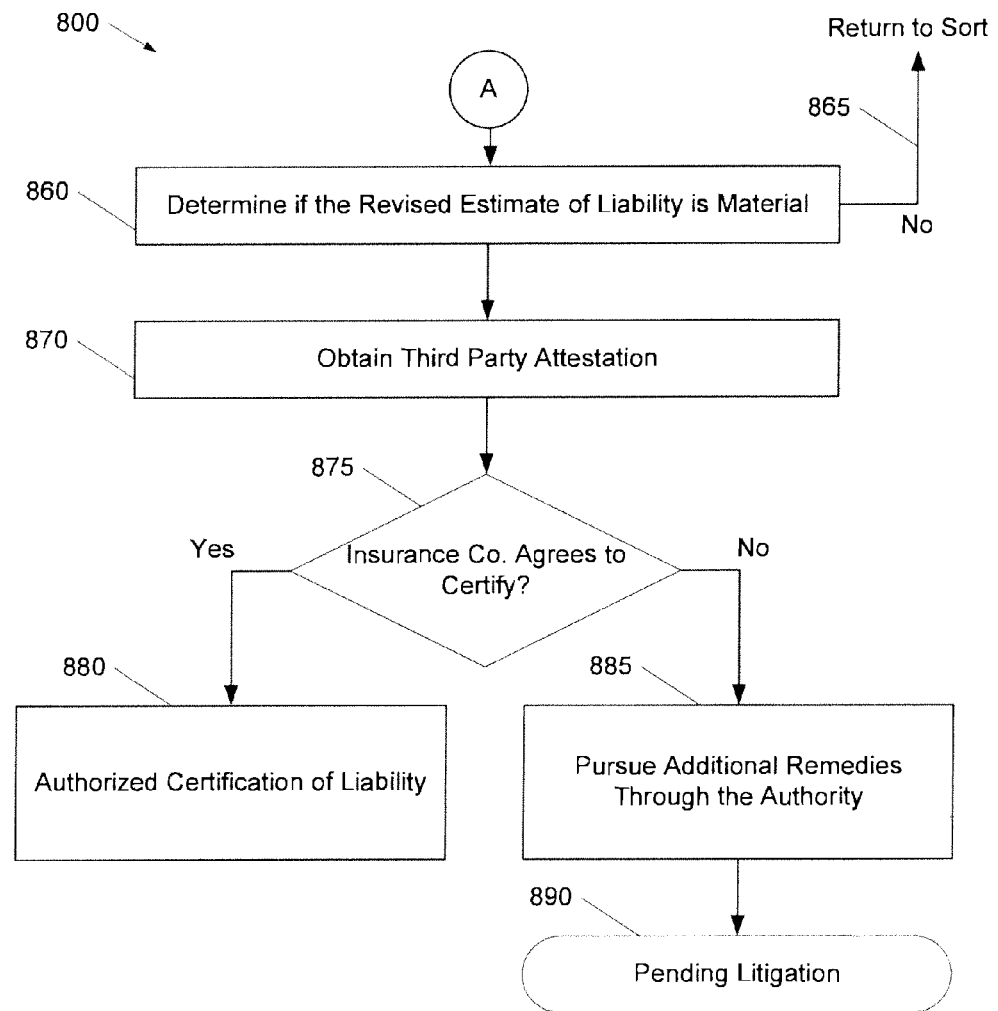
FIG. 8B is a flow diagram of the method for estimating unpaid claims in accordance with a representative embodiment.

Referring to FIG. 8B, a flow diagram of the method 800 for estimating unpaid claims in accordance with a representative embodiment is shown. Additional, fewer, or different operations may be performed depending on the particular implementation. The operations for estimating unpaid claims continue from reference point 'A.'

In an operation 860, the materiality of the revised estimate of liability is determined. For example, actual money paid to beneficiaries can be compared against the revised estimate of liability which can be statistically verified, as described above. The actual money paid to beneficiaries can be determined from the insurance carrier's financials and/or insurance carrier records. State law defines what is material. Thus, for example, the if a difference in the actual money paid to beneficiaries and the revised estimate of liability passes a threshold of materiality, the liability is material. Various ratios, payout levels, etc. can be checked for materiality or other threshold requirements as determined by the particular state's law. If the revised estimate of liability does not show a material deficiency, arrow 865 can be pursued such that operation 805 can be repeated and the next organization can be analyzed.

In an operation 870, if a material deficiency is likely, a third party attestation can be obtained. Based on one or all of the revised estimate of liability, the preliminary estimate of liability, the pre-audit model, the preliminary model of employment history, the adjustment factors, and support documentation, an auditing firm can verify the above analysis. Attestation services are available from various accounting and auditing firms such as KPMG, Deloitte and Touche, Grant Thornton, etc. The attestation verifies the findings of employee groups with material liability for unpaid beneficiaries. This attestation can be provided to the insurance carrier. In one illustrative embodiment, an authorized certification of liability can be requested from the insurance carrier as per the particular state's laws and regulations.

In an operation 875, the insurance carrier decided whether or not to certify the attestation. In an operation 880, the insurance carrier certifies the attestation and an authorized certification of liability is created. In an operation 885, the insurance carrier does not certify the attestation and other remedies can be pursued through the authority. For example, the authority can decide to fine or sue the insurance carrier. Alternatively, in some states, a third party may sue on behalf of claimants. In an operation 890, litigation has begun based on the insurance carrier not certifying the attestation.

Alternatively, other liabilities besides unpaid life insurance claims can be analyzed. The method and system for estimating unpaid claims can be used for analyzing other unpaid claims or liabilities related to health insurance benefits, disability benefits, pension benefits, death benefit riders, burial policies, or retirement benefits. Alternatively, other benefit providers besides life insurance carriers can be analyzed. Advantageously, insurance carriers that improperly manage claim payout can be effectively identified.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for analyzing liabilities comprising:
a claims analyzer configured to:
create a preliminary model of employment history of at least one organization;
create a pre-audit model of the at least one organization;
generate adjustment factors for pre-audit model based in part on the preliminary model of employment history;
apply the adjustment factors to the pre-audit model; and
create a preliminary estimate of liability associated with the at least one organization based on the preliminary model of employment history and the pre-audit model;
wherein the preliminary estimate of liability is configured to reveal an unpaid predefined liability associated with the at least one organization.

2. The apparatus of claim 1, wherein the claims analyzer is further configured to:
aggregate employment information of the at least one organization;
wherein the preliminary model of employment history is based, in part, on the aggregated employment information.

3. The apparatus of claim 1, wherein the claims analyzer is further configured to:
aggregate contract information associated with at least one employee of the at least one organization;
wherein the pre-audit model is based, in part, on the aggregated contract information.

4. The apparatus of claim 1, wherein the preliminary estimate of liability comprises an assessment of at least one of unpaid life insurance claims, unpaid death benefit rider claims, and unpaid burial policies.

5. The apparatus of claim 1, wherein the claims analyzer is further configured to:
create a revised estimate of liability associated with the at least one organization based on a statistical analysis of information from a sample set of at least one of records of the at least one organization, and records of an insurance carrier associated with the revised estimate of liability.

6. The apparatus of claim 1, wherein the claims analyzer is further configured to:
determine a materiality of the preliminary estimate of liability;
wherein the materiality is defined by at least one state law or at least one state regulation.

7. A method for analyzing liabilities comprising:
creating, at a claims analyzer, a preliminary model of employment history of at least one organization;
creating a pre-audit model of the at least one organization;
generating adjustment factors for pre-audit model based in part on the preliminary model of employment history;
applying the adjustment factors to the pre-audit model; and
creating a preliminary estimate of liability associated with the at least one organization based on the preliminary model of employment history and the pre-audit model;
wherein the preliminary estimate of liability is configured to reveal an unpaid predefined liability associated with the at least one organization.

8. The method of claim 7, further comprising:
aggregating employment information of the at least one organization;
wherein the preliminary model of employment history is based, in part, on the aggregated employment information.

9. The method of claim 8, wherein the aggregated employment information includes at least one of:
financial characteristics of the at least one organization;
industry labor statistics;
event activity;
employee demographic factors;
records of an insurance commissioner; and
benefit package information.

10. The method of claim 7, further comprising:
aggregating contract information associated with at least one employee of the at least one organization;
wherein the pre-audit model is based, in part, on the aggregated contract information.

11. The method of claim 7, wherein the preliminary estimate of liability comprises an assessment of at least one of unpaid life insurance claims, unpaid death benefit rider claims, and unpaid burial policies.

12. The method of claim 7, further comprising:
requesting authorization from an authority to recover or audit from at least one of the at least one organization, and an insurance carrier associated with the preliminary estimate of liability.

13. The method of claim 12, further comprising:
creating a revised estimate of liability associated with the at least one organization based on a statistical analysis of information from a sample set of at least one of records of the at least one organization, and records of the insurance carrier bound by at least one contract with at least one employee of the at least one organization.

14. The method of claim 13, further comprising:
obtaining a third party attestation of the revised estimate of liability; and
presenting the third party attestation to the authority.

15. The method of claim 7, further comprising:
determining a materiality of the preliminary estimate of liability;
wherein the materiality is defined by at least one state law or at least one state regulation.

16. An article of manufacture including a non-transitory computer-readable medium having instructions stored thereon that, if executed by a computing device, cause the computing device to perform operations comprising:
creating a preliminary model of employment history of at least one organization;
creating a pre-audit model of the at least one organization;
generating adjustment factors for pre-audit model based in part on the preliminary model of employment history;
applying the adjustment factors to the pre-audit model; and
creating a preliminary estimate of liability associated with the at least one organization based on the preliminary model of employment history and the pre-audit model;
wherein the preliminary estimate of liability is configured to reveal an unpaid predefined liability associated with the at least one organization.

17. The article of manufacture of claim 16 further comprising instructions stored thereon that, if executed by a computing device, cause the computing device to perform operations comprising:
aggregating employment information of the at least one organization;
wherein the preliminary model of employment history is based, in part, on the aggregated employment information.

18. The article of manufacture of claim 16 further comprising instructions stored thereon that, if executed by a computing device, cause the computing device to perform operations comprising:
  aggregating contract information associated with at least one employee of the at least one organization;
  wherein the pre-audit model is based, in part, on the aggregated contract information.

19. The article of manufacture of claim 16, wherein the preliminary estimate of liability comprises an assessment at least one of unpaid life insurance claims, unpaid death benefit rider claims, and unpaid burial policies.

20. The article of manufacture of claim 16 further comprising instructions stored thereon that, if executed by a computing device, cause the computing device to perform operations comprising:
  creating a revised estimate of liability associated with the at least one organization based on a statistical analysis of information from a sample set of at least one of records of the at least one organization, and records of an insurance carrier associated with the revised estimate of liability.

* * * * *